(No Model.)
T. G. READ.
FIFTH WHEEL.
No. 554,375. Patented Feb. 11, 1896.
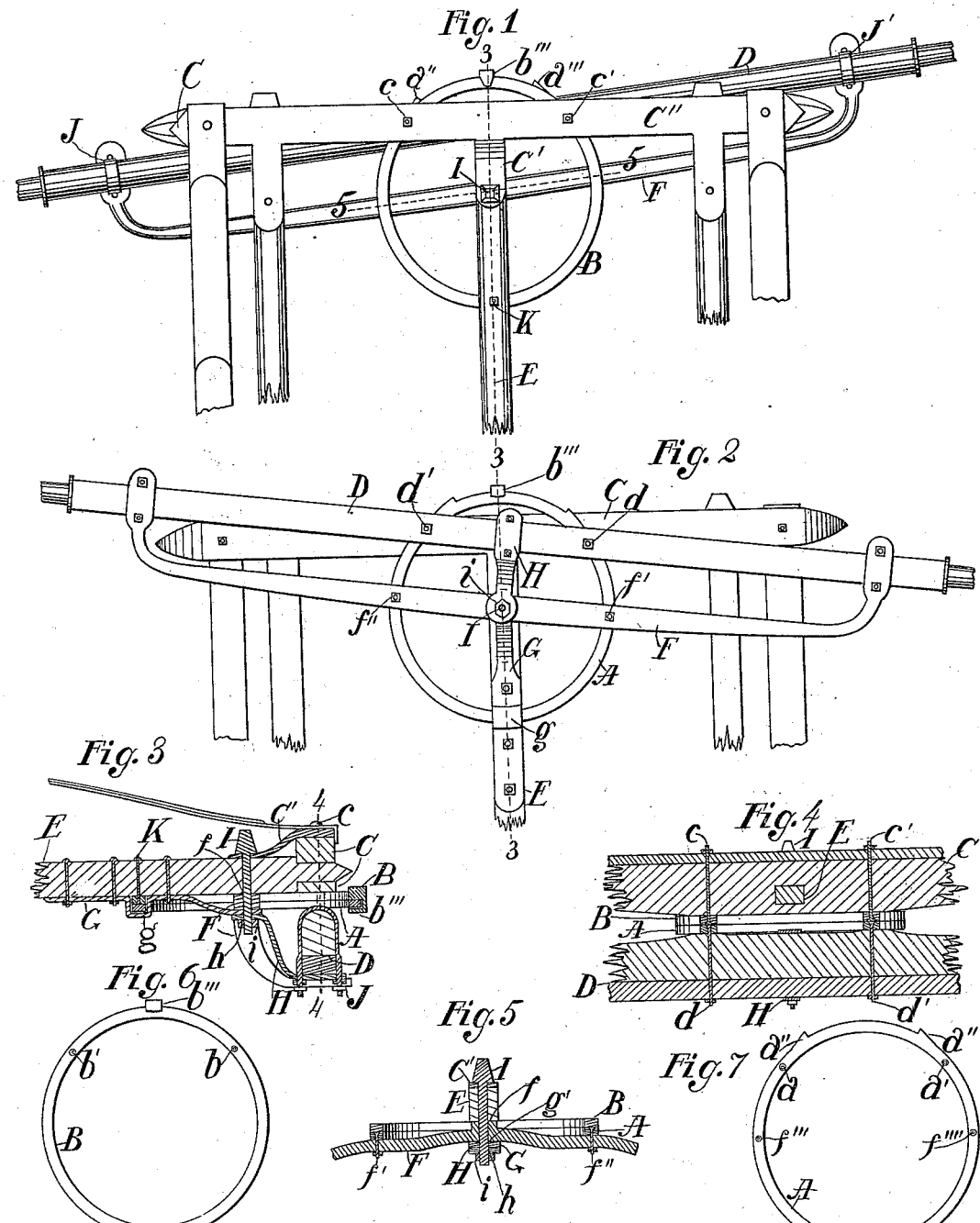
Witnesses:
F. T. Johnson
F. M. Townsend
Inventor:
Thomas George Read
by Hazard & Townsend
his attys

UNITED STATES PATENT OFFICE.

THOMAS G. READ, OF LOS ANGELES, CALIFORNIA, ASSIGNOR OF ONE-HALF TO LOUIS STREUBER, OF SAME PLACE.

FIFTH-WHEEL.

SPECIFICATION forming part of Letters Patent No. 554,375, dated February 11, 1896.

Application filed May 17, 1895. Serial No. 549,664. (No model.)

*To all whom it may concern:*

Be it known that I, THOMAS GEORGE READ, a citizen of the United States, residing at Los Angeles, in the county of Los Angeles and State of California, have invented new and useful Improvements in Fifth-Wheels, of which the following is a specification.

My invention relates to that class of fifth-wheels in which the center or pivotal axis is located at the rear of the axle and in which provision is made for stopping the pivotal movement of the axle before the wheels touch the bed of the vehicle, thereby avoiding all liability of upsetting the vehicle by turning it, and also doing away with the necessity of rub-plates and like appliances.

One object of my invention is to provide a superior form of construction and to so construct, arrange and combine the parts as to give greater strength and to avoid all possibility of breakage.

With my appliance the king-bolt is relieved of nearly all the strain and wear, and the strain is thrown upon parts which are very strong though not large or heavy. As applied, it comprises the combination of a lower circular ring-plate fixed to the top of the front axle of a vehicle and having an arc thereof arranged projecting in front of the axle and provided with two stops, one on each side of the middle of such arc, equidistant therefrom, an upper circular ring-plate resting on the lower ring-plate and fixed to the under side of the reach and the bolster of the vehicle, and having an arc thereof projecting in front of the bolster and provided with a clip-lug and stop arranged in the middle of such arc to project down in front of and to embrace the lower ring-plate between the stop-lugs thereof, and a loop fixed to the reach and embracing the two ring-plates diametrically opposite the clip-lug. By this construction the load-supporting bearings are always the same and the draft strain exerted upon the reach by the axle is borne by the clip-lug and the loop in engagement with the lower ring-plate and is always in true line with the mid-line of the reach; and by removing the loop and slipping the reach and bolster forward they can be readily removed from the axle.

In practice I employ a king-bolt centrally located in line between the clip-lug and the loop and connected with the reach and axle, and the draft strain is therefore always borne by three bearings, all of which are always in direct line with the mid-line of the reach.

My invention is embodied in a manufactured fifth-wheel which can be carried in stock and applied to single-reach, two-reach and three-reach vehicles without any difficulty by an ordinary workman. I also provide for conveniently taking the vehicle apart.

With my improved fifth-wheel the front axle and wheels can be removed with very great ease and facility, but the vehicle is not liable to uncouple accidentally, even without the king-bolt.

My invention consists in the combination of parts hereinafter set forth and claimed.

The accompanying drawings illustrate my invention.

Figure 1 is a fragmental top plan showing my invention applied to the running-gears of a three-reach vehicle, the axle being slightly turned for clearness of illustration. Fig. 2 is a bottom view of the same. Fig. 3 is a longitudinal section along the middle reach, as indicated by line 3 3, Figs. 1 and 2, except that in this view the axle is at right angles to the reach. Fig. 4 is a vertical section along the axis of the head-block and axle, indicated by line 4 4, Fig. 3. Fig. 5 is a vertical section longitudinal the bridle-stay and king-bolt, line 5 5, Fig. 1. Fig. 6 is a plan of the under side of the top ring-plate. Fig. 7 is a plan of the upper side of the lower ring-plate.

A indicates the lower circular ring-plate provided in front of its center with the two countersunk axle-bolt holes $a$ $a'$ and with the two stop-lugs $a''$ $a'''$ arranged in front of such bolt-holes.

B indicates the upper circular ring-plate provided in front of its center with countersunk bolt-holes $b$ $b'$ and provided in front of such bolt-holes and midway between the same with the clip-lug and stop $b'''$.

C indicates the head fastened to the upper ring-plate by bolts $c\,c'$ passed through the bolt-holes in such plate.

D indicates the axle fastened to the lower ring-plate by bolts $d\,d'$ passed through the bolt-holes $a\,a'$ in such lower ring-plate.

E indicates the reach fastened to the head.

C' indicates the head keeper-stay projecting rearward from the top of the head to the king-bolt.

F indicates the bridle-stay fastened at its ends to the axle and projecting rearwardly therefrom and provided at its middle with the king-bolt hole $f$ and extending across the lower ring-plate and fastened thereto on opposite sides of the king-bolt hole by bolts $f'\,f''$ passed through countersunk holes $f'''\,f''''$ in the lower ring-plate.

G indicates the reach keeper-stay fastened to the under side of the reach and provided with the loop $g$ embracing the plates behind the king-bolt. The stay G is also provided, at its front end, with the king-bolt holes $g'$.

H indicates the axle keeper-stay fastened to the axle and projecting back therefrom and provided at its rear end with the king-bolt hole $h$.

I indicates the king-bolt inserted through the head keeper-stay, the reach, the bridle-stay, the reach keeper-stay and the axle keeper-stay.

The bridle-stay is secured to the axle by the clips J J'.

K indicates a bolt through the rear of the upper ring-plate and through the reach to fasten the ring-plate to the reach behind the king-bolt.

In practical operation, when the vehicle is to be turned, the clip-lug and stop $b'''$ engages with one of the side stop-lugs $a''$ or $a'''$, and the strain is equally divided and is sustained by the various parts, so that there is no danger of breakage.

The manufactured parts to be carried in stock, so as to apply the fifth-wheel to an ordinary vehicle, comprise the two ring-plates, the bridle-stay, the front and rear stays C', H, and G and the king-bolt.

To apply my invention to an ordinary vehicle, the front axle and wheels are removed, the bridle-stay and lower ring-plate are fastened thereto and the lower ring-plate is fastened to the bridle-stay by the bolts $f'\,f''$. The upper ring-plate is then fastened to the head and to the under side of the reach, the reach is provided with a hole for the king-bolt and the head-stay is fastened to the head and to the top of the reach. This head-stay is preferably made in the form of a projecting arm of a plate C'' extending from end to end of the head to give strength to the head, and the plate may be provided with rearward projections for each of the reaches, as shown in the drawings. After the parts have been fastened the front wheels are brought under the reach and head and brought to the rear far enough to allow the lower ring-plate to be inserted into the space between the clip-lug and the body of the upper ring-plate. The axle and wheels are then run forward until the lower ring-plate is embraced by the clip and the rings coincide. Then the rear or reach stay is applied with its loop embracing the rear of the two ring-plates and said stay is then fastened to the reach. The front stay is then or previously fastened to the axle, and the king-bolt holes in the front and rear stays and the bridle-stay are then made co-axial with the ring-plates, and the king-bolt is then inserted through the king-bolt holes in the reach and the several stays and is secured by a nut.

In case of a two-reach vehicle, two bolt-holes instead of one would be required in the upper ring-plate to fasten the same to the two bars of the reach. These can be easily made by the workman who applies the device or can be made when the parts are manufactured.

Now, having described my invention, what I claim as new, and desire to secure by Letters Patent, is—

1. The combination of the lower circular ring-plate provided in front of its center with the two countersunk bolt-holes and with the two stops arranged in front of such bolt-holes; the upper circular ring-plate provided in front of its center with countersunk bolt-holes and provided in front of such bolt-holes and midway between the same with the clip-lug and stop; the head fastened to the upper ring-plate by bolts passed through the bolt-holes in such plate; the axle fastened to the lower ring-plate by the bolts passed through the bolt-holes in such lower plate; the reach fastened to the head; the bridle-stay fastened at its ends to the axle and projecting rearwardly therefrom and provided at its middle with the king-bolt hole and extending across the lower ring-plate midway between its front and rear and fastened to such ring-plate on opposite sides of the king-bolt hole; the reach keeper-stay fastened to the under side of the reach and provided with the loop embracing the rear of the two ring-plates, and also provided at its front end with the king-bolt hole; the axle keeper-stay fastened to the axle and provided at its rear end with the king-bolt hole; the head keeper-stay fastened to the head and projecting rearward therefrom and provided with the king-bolt holes; and the king-bolt inserted through the reach, the bridle-stay, and the bolt-holes of the three keeper-stays.

2. The combination set forth of the axle, the reach, the head fastened to the reach, the lower circular ring-plate fastened to the axle with its center behind the axle, and having in front of the axle two stop-lugs; the upper circular ring-plate fastened to the head in front of its center and to the reach behind its center and provided in front of the head with the clip-lug and stop which extends downward in front of and partially embraces the lower ring-plate between the stop-lugs; the bridle-stay fastened to the axle and to the lower ring-plate and provided in its middle with the king-bolt hole; the rear keeper-stay provided with the loop, fastened to the under side of the reach and arranged embracing the two ring-plates at the rear of the center thereof, and provided with the king-bolt hole; the front axle keeper-stay; and the king-bolt inserted through the reach, the bridle-stay and the rear and front keeper-stays.

3. The combination set forth of the axle, the head and the reach fastened to the head; the lower circular ring-plate fastened to the axle with its center behind the axle and having in front of the axle two stop-lugs; the upper circular ring-plate fastened to the head in front of its center and to the reach behind its center; and provided in front of the head with the clip-lug stop which extends downward in front of and partially embraces the lower ring-plate between the stop-lugs; the bridle-stay fastened to the axle and the lower ring-plate and provided with the king-bolt hole coaxial with the lower ring-plate; the rear keeper-stay fastened to the reach and provided with the king-bolt hole and with the loop arranged embracing the two ring-plates at the rear of the center thereof; and the king-bolt inserted through the reach, the bridle-stay, and the keeper-stay.

4. The combination of the circular ring-plate fixed to the axle and having an arc thereof projecting in front of the axle and provided with two stops one on each side of the middle of such arc; the upper circular ring-plate resting on the lower ring-plate and fixed to the reach and bolster and having an arc thereof projecting in front of the bolster and provided with a clip-lug and stop arranged in the middle of such arc to project down in front of and embrace the lower ring-plate between the stop-lugs thereof; and the loop fixed to the reach and embracing the two ring-plates diametrically opposite the clip-lug and stop.

THOMAS G. READ.

Witnesses:
JAMES R. TOWNSEND,
F. M. TOWNSEND.